(12) United States Patent
Baldwin et al.

(10) Patent No.: US 10,021,295 B1
(45) Date of Patent: Jul. 10, 2018

(54) VISUAL CUES FOR MANAGING IMAGE CAPTURE

(71) Applicant: Amazon Technologies, Inc., Reno, NV (US)

(72) Inventors: Leo Benedict Baldwin, San Jose, CA (US); Steven Michael Sommer, Bellevue, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 589 days.

(21) Appl. No.: 13/908,946

(22) Filed: Jun. 3, 2013

(51) Int. Cl.
*H04N 7/00* (2011.01)
*H04N 5/232* (2006.01)

(52) U.S. Cl.
CPC ............... *H04N 5/23238* (2013.01)

(58) Field of Classification Search
CPC ...................................... H04N 5/232
USPC ............................................. 348/36
See application file for complete search history.

(56) References Cited

U.S. PATENT DOCUMENTS

| | | | |
|---|---|---|---|
| 6,930,703 B1* | 8/2005 | Hubel | G03B 37/04 348/208.16 |
| 2004/0100565 A1* | 5/2004 | Chen | G06T 3/4038 348/229.1 |
| 2009/0021576 A1* | 1/2009 | Linder et al. | 348/36 |
| 2010/0265313 A1* | 10/2010 | Liu et al. | 348/36 |
| 2012/0019614 A1* | 1/2012 | Murray et al. | 348/36 |

* cited by examiner

*Primary Examiner* — On S Mung
(74) *Attorney, Agent, or Firm* — Polsinelli LLP

(57) ABSTRACT

Approaches are described for managing the capture and/or presentation of images, such as panorama images. An electronic device can be used to "paint" the scene desired to be captured, where the device can be panned horizontally or vertically, or both, to capture images of a much larger area than the field of view of the camera. The overlap between adjacent images can be determined image-by-image and visual or other cues can be provided to assist a user controlling the device to pan the device in a particular manner to ensure an appropriate amount of overlap between captured images. Further, the user can be presented the entire panorama image being captured at the highest scale possible by filling the display element of the device with the image and dynamically scaling down the image as the user continues to add to the panorama image.

20 Claims, 12 Drawing Sheets

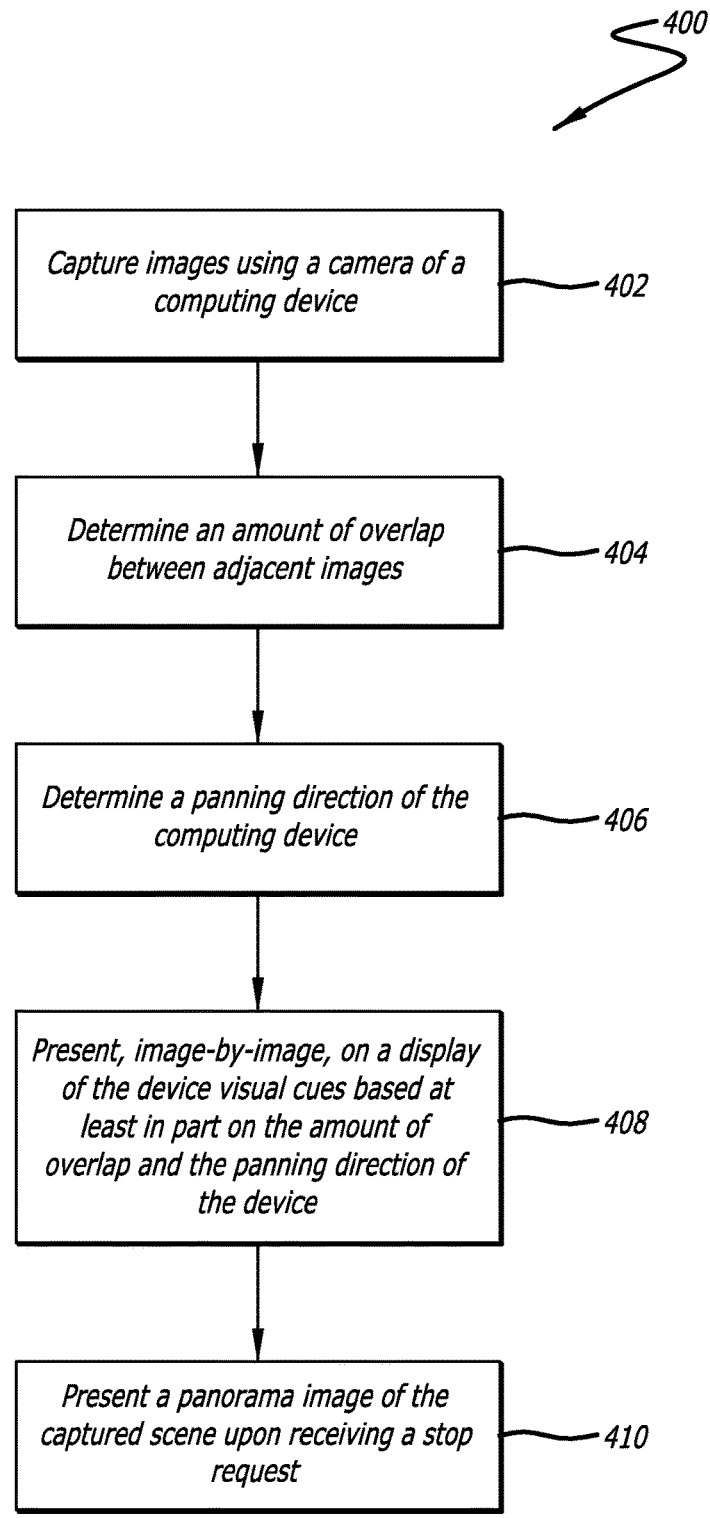

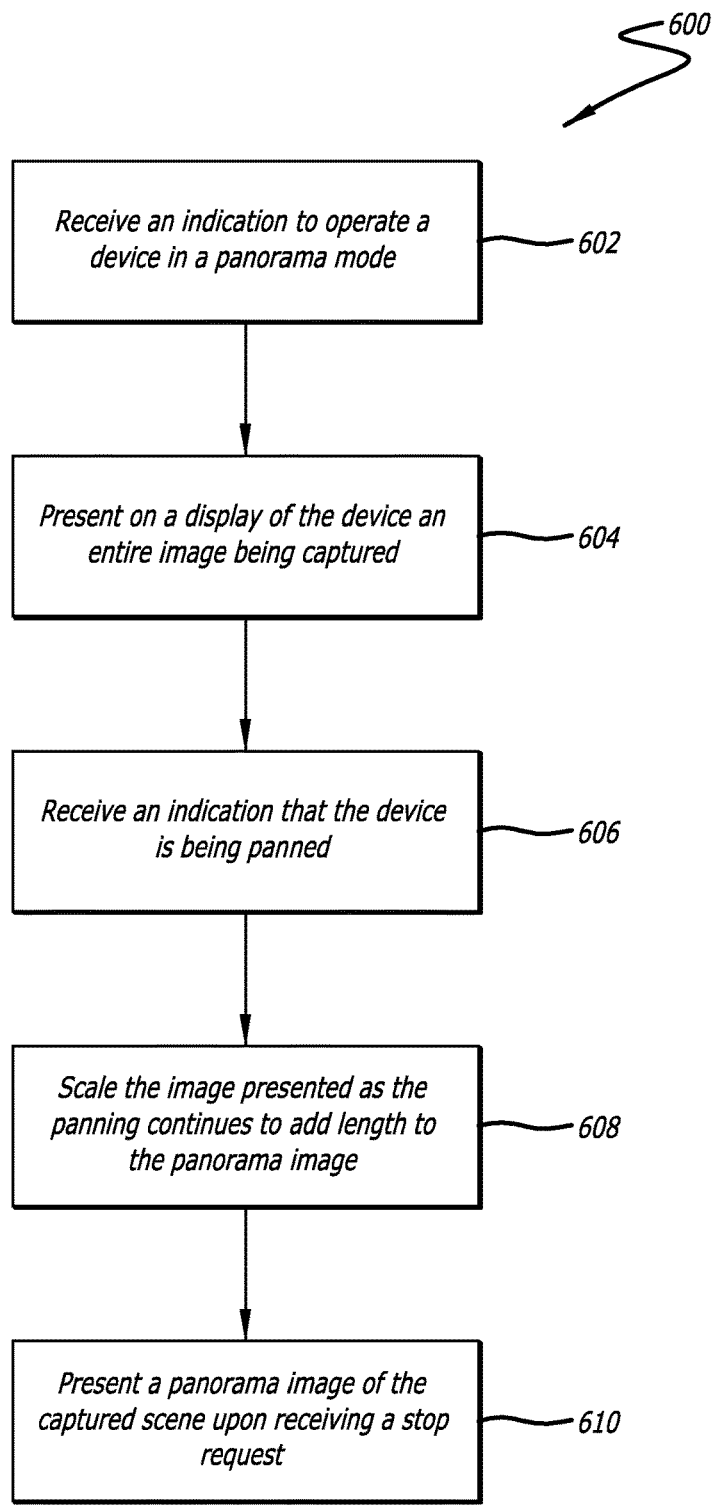

10,021,295 B1

VISUAL CUES FOR MANAGING IMAGE CAPTURE

BACKGROUND

As computing devices offer increasing processing capacity and functionality, users are able to operate these devices in an expanding variety of ways. For example, mobile devices are increasingly offering multiple high quality cameras that are capable of capturing high resolution images and/or videos. Further, many of these devices can operate in a panorama mode where the device can obtain a series of images that can be stitched together to generate a panorama image. When operating the device in such a mode, the user is cued for the next image by a rectangle showing the required overlap region between the last image and the current image. A fraction of the previous image that should be overlapped may be ghosted in as a further aid to obtaining the correct overlap and alignment. Other cues may also be used to aid in obtaining the correct overlap and alignment required to create the panorama image. However, in many situations, the current visual cues do not accommodate other approaches used in obtaining images for generating panorama images. Further, in many situations, these devices lack the computing power and/or storage capacity to adequately process the images.

BRIEF DESCRIPTION OF THE DRAWINGS

Various embodiments in accordance with the present disclosure will be described with reference to the drawings, in which:

FIG. 4 illustrates an example process for managing the capture and/or presentation of images in accordance with various embodiments;

FIG. 6 illustrates an example process for managing the capture and/or presentation of image information in accordance with various embodiments;

DETAILED DESCRIPTION

Figure 1A:
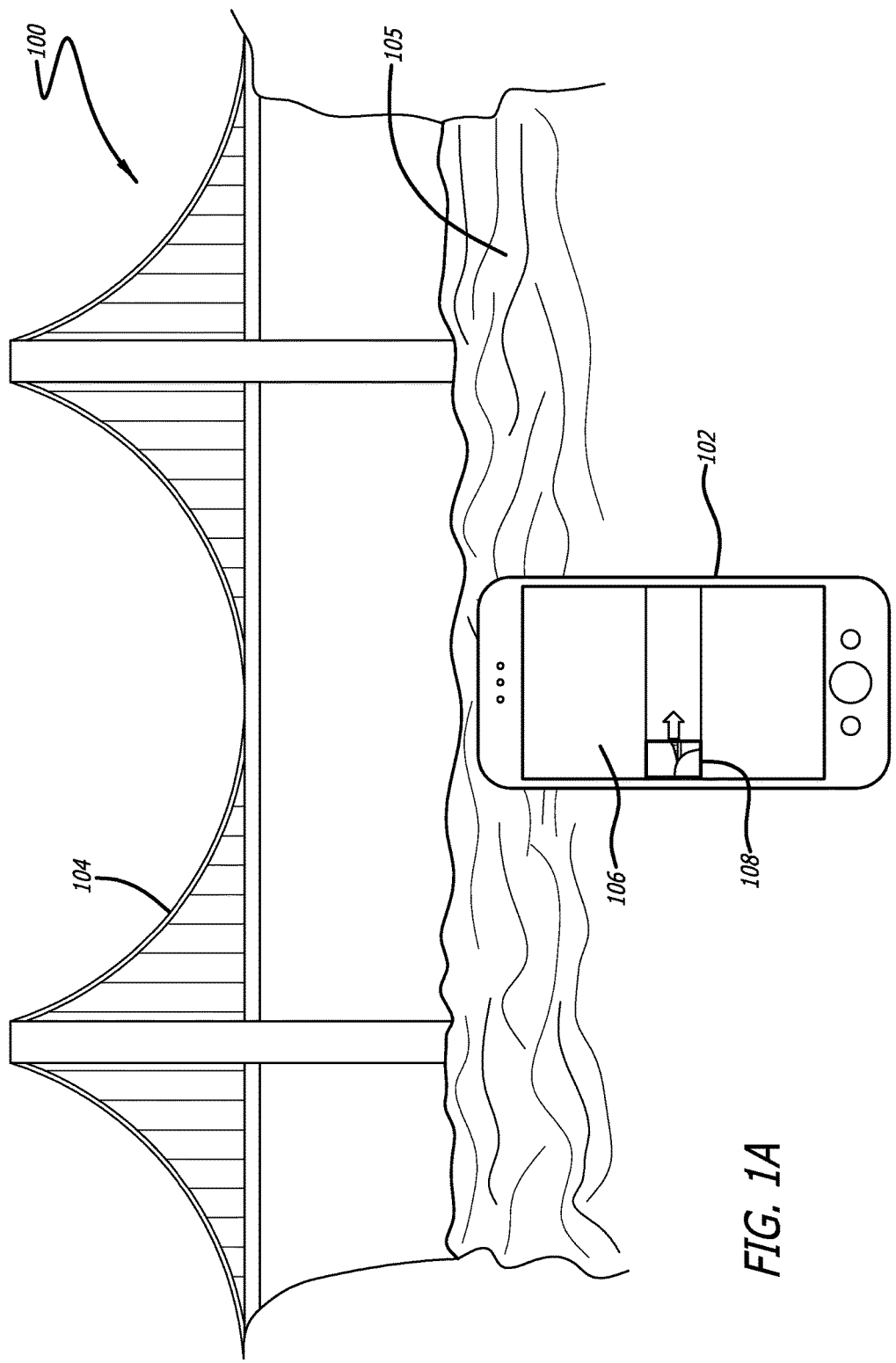
FIGS. 1(a) and 1(b) illustrate an example of image capture and presentation in accordance with an embodiment.

Systems and methods in accordance with various embodiments of the present disclosure may overcome one or more of the foregoing or other deficiencies experienced in conventional approaches for managing the capture and/or presentation of image information (e.g., still images or video) via an electronic device. In particular, various embodiments provide for visual, audible, and/or haptic cues to assist a user in controlling a device when capturing panorama or other such images.

In various embodiments, an electronic device (e.g., a mobile, tablet computer, etc.) or other portable computing device can be caused to operate in an image capture mode, such as a panorama mode, where a camera of the device can obtain full resolution streaming video. The device can be used to "paint" the scene desired to be captured, where the device can be panned horizontally or vertically, or both, to capture images of a much larger area than the field of view of the camera. During such an approach, images can be captured continuously and the overlap between adjacent images can be determined image-by-image to ensure an appropriate amount of overlap required for stitching images together to generate a panorama image. Image correlation algorithms and/or sensor information obtained from device components (e.g., the gyroscope, accelerometer, or other positioning determining components) can be used to determine an amount of overlap between adjacent images. A set of dynamic visual cues can be used to assist a user controlling the device, such as by visually instructing the user to pan the device in a particular manner (e.g., faster, slower, or to reposition the device to recapture images representing a part of the scene that may have been missed) to ensure the appropriate amount of overlap and alignment between captured images required for stitching images together.

Other approaches can be used as well in managing the capture and/or presentation of image information. For example, a user operating a device in a panorama mode can be presented the entire image being captured at the highest scale possible by filling the entire display element with the image and dynamically scaling down the image as the user continues to add to the panorama. Depending on the orientation of the device, screen dimensions, and direction of the panorama being captured, one of the height or width is scaled down as the panorama image is obtained. The display can indicate which portion of the panorama image being captured is currently in the camera's field of view by representing that portion of the panorama image as being inside a box or some other visual indicator. In accordance with various embodiments, the user is presented the actual panorama image captured throughout the image capture process.

In at least some embodiments, the images can be processed completely or partially on the device such as to determine an appropriate amount of overlap between images. The processed images can be provided to at least one image analysis service in order to attempt to further process the images, such as to create a panorama image and/or enhance the images. The image analysis service can be operating on a remote server, such as may be executing in a shared resource environment or "in the cloud". The device can upload, stream, or otherwise transfer the images (e.g., the captured images or data resulting from processing the image), either automatically or in response to a user action, which can direct at least a portion of the images to one or more image analysis services (or devices, or modules, etc.). Other types of data also can be supplied as well in some embodiments, as may include positioning information, orientation information, and/or temporal information, among other types of information. The image analysis service can include one or more algorithms useful for image enhancement, such as to improve a quality, resolution, sharpness, color depth of the images, and/or correct for lens distortion, perspective, brightness, rotation, etc.

While in some embodiments the processing of the image can be performed on the device, in many embodiments, the remote server can be used to process the images to create a panorama image. For example, the device can capture images that can be tagged as being part of a panorama image. The images can be communicated to the remote server where, upon receiving the images, the remote server can combine the images to generate the panorama image based on the tag associated with each image. Thereafter, the panorama image can be processed further, such as to correct for lens distortion, perspective, brightness, rotation, etc. Additionally, in accordance with an embodiment, the remote server can be configured to detect at least a portion of one of the images overlapping another one of the images, and can combine pixel values for corresponding locations of adjacent images for reasons such as noise reduction. Thereafter, the panorama image can be provided to the device from the remote server, where the user can be prompted to accept, save, and/or discard the panorama image. Other approaches can be utilized as well, such as to enable the subsequent viewing and utilizing of the panorama image. The accepted (and in some instances the discarded) image can be stored on the device and/or on a database in communication with the remote server, among other such options.

Various other functions and advantages are described and suggested below as may be provided in accordance with the various embodiments.

Figure 1B:
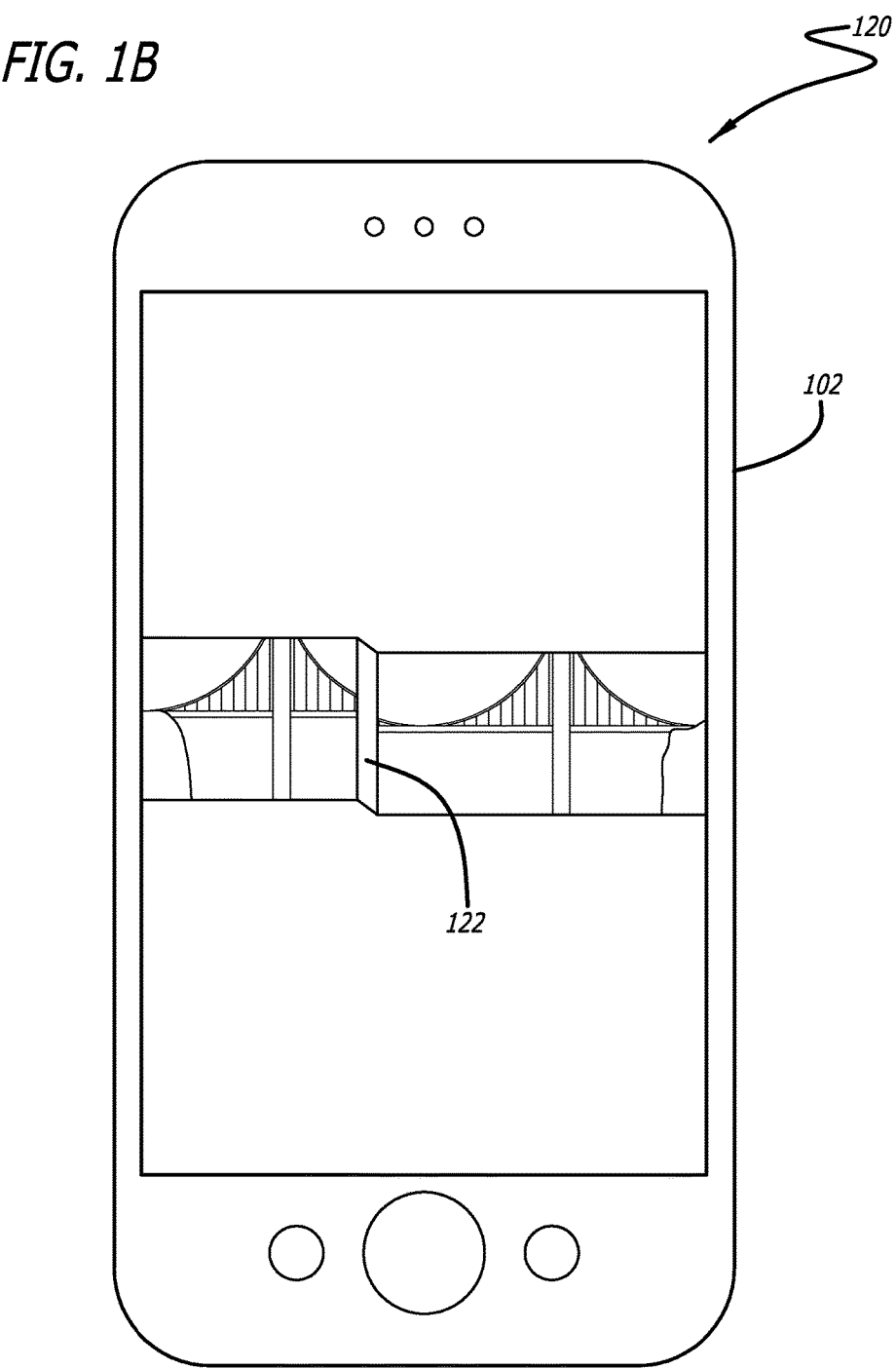

FIGS. 1(a) and 1(b) illustrate an example of image capture and presentation in accordance with an embodiment. As shown in example 100 of FIG. 1(a), a portable computing device 102 (e.g., a mobile phone, a table computer, etc.) can be used to capture an image of a scene that includes a bridge 104 and water 105. The portable computing device can include, for example, a camera and an interface 106 (e.g., a display element) that displays the field of view of the camera. The device can be aimed in different directions and the interface can display an image or video of the active field of view being captured by the camera. Although a portable computing device (e.g., a smart phone, an e-book reader, or tablet computer) is shown, it should be understood that various other types of electronic devices can be used in accordance with various embodiments discussed herein. These devices can include, for example, notebook computers; personal data assistants; cellular phones; video gaming consoles or controllers; portable media players; wearable computers (e.g., watches, glasses, etc.); among others. The device can include other elements useful for imaging as well, such as a light sensor for determining an amount of ambient light and a white light LED, or other such illumination element, useful in illuminating objects within at least a portion of a field of view of the camera.

A user can use the camera of the device to capture an image of at least a portion of the bridge. However, when the user is at certain angles or distances from the bridge, a single image may not be sufficient to capture the entire bridge. In this situation, the user may have to capture multiple images in order to capture the entire bridge and then use photo editing software to stitch the images together to create a panorama image of the bridge. Alternatively, the user can operate the device in a panorama mode to capture a panorama image of the bridge. In this approach, multiple images can be captured in succession and the device can stitch the images together to generate the panorama image. In many situations, the device can provide visual cues that guide a user to ensure an appropriate amount of overlap between adjacent images. For example, a user can be cued to the next image by a rectangle 108 showing the required overlap region between the previous image and the current image. Further, the fraction of the previous image that should be overlapped can be ghosted in as a further aid to obtaining the correct overlap and alignment. Although these cues may be useful in generating a panorama image in some instances, there are situations where other cues may be desirable. Further, in many situations, conventional approaches for capturing a panorama image only provide for panning in one direction when capturing a panorama image. If the user desires to capture a panorama image in a different direction, for example a vertical direction as opposed to a horizontal direction, the user would have to end capturing the current panorama image in the horizontal direction and capture a second panorama image in a vertical direction. This can be frustrating to a user who is attempting to obtain a panorama image of a large scene, such as the bridge and water illustrated in FIG. 1(a). Additionally, conventional approaches for capturing a panorama image do not identify missed areas of a scene (e.g., due to the user panning too quickly) or allow a user to rescan a missed area. As such, the picture may be incomplete and/or contain distortions or other such errors. For example, as illustrated in example 120 of FIG. 1(b), although the panorama image includes the bridge, the water below the bridge has not been captured. Further, because the user was panning too quickly, the image of the bridge is distorted 122 such that a portion of the bridge is not included in the panorama image and the areas adjacent to the missing portion of the image are disjointed. Further still, without appropriate cues guiding a user to pan at an optimal panning speed, the image may include artifacts and other types of noise, color distortions, among other image flaws.

Accordingly, in accordance with various embodiments, approaches enable a user of a computing device to capture a panorama image by sweeping the device horizontally or vertically, or both, such that the user is able to "paint" the scene desired to be captured. Further, to ensure an appropriate amount of between adjacent images, approaches provide for a number of visual, audio, and/or haptic cues to be presented to the user to guide the user in panning the device. Such an approach is illustrated in FIGS. 2(a), 2(b), 2(c), 2(d), and 2(e). As shown in example 200 of FIG. 2(a), a portable computing device 202 is being used to capture a panorama image of a bridge 204 and water 205. When capturing the image, the user can set their device in a panorama mode, where in this mode, a video stream of images can be captured as the device is panned horizontally or vertically, or both, as is possible with zero shutter lag (ZSL) techniques. ZSL refers to the operation of a camera on a computing device in full resolution video mode, such that when the shutter button is pressed, a user of the device may not necessarily have to press the shutter button to capture an image. Instead, the device will automatically release the shutter to capture full resolution streaming video, which can be used to generate a panorama image on the device, or transmitted to a remote server for further processing.

As described, a panorama image can be captured by panning the device in multiple directions, such as horizontally (e.g., left or right) or vertically (e.g., up or down) relative to a scene or an object being captured. In this way, the device can be used to "paint" the scene desired to be captured to generate an image of a much larger area than the field of view of the camera. In such an approach, images are captured continuously and the overlap between adjacent images is determined image-by-image to ensure an appropriate amount of overlap and alignment required for stitching the images together. Image correlation algorithms and/or sensor information obtained from device components (e.g., the gyroscope, accelerometer, or other positioning determining components) can be used to determine an amount of overlap between adjacent images, and based on the amount of overlap, visual, audio, and/or haptic cues can be provided to the user to help guide the user in panning the device to ensure the appropriate amount of overlap.

In accordance with various embodiments, image correlation between adjacent images or portions of those images can be performed using reduced or full resolution images. A reduced image can be determined from the full resolution image using one or more image subsampling algorithms. For example, a full resolution image can be subsampled into a lower resolution image by combining (e.g., averaging) adjacent pixels of a predetermined area size (e.g., 2×2, 4×4, etc.) of the full resolution image into one pixel for the subsample image. This can be performed for an appropriate number of full resolution images and the resulting subsampled images can be used in the image correlation process.

Correlation computations between adjacent images or portions of those images can be performed using one or more correlation algorithms. For example, in one instance, the integer components of an image's brightness at each pixel location can be used in a cross-correlation algorithm to determine the level of similarity between the overlapping pixel locations of adjacent images. In another instance, the pixel values in overlapping pixel locations of adjacent images can be treated as a vector (e.g., in the case of color images), the vectors can be normalized to account for variation in brightness due to light and exposure conditions, and the cross-correlation between the two images can be computed. The result can be a value between 0 and 1, and the result can be used to indicate an amount of overlap between the two images. The result can be compared to a predetermined threshold that indicates a level of acceptable overlap, and an appropriate visual cue can be provided to the user based on whether the result is above or below the threshold. It should be noted that it is well understood how to perform correlations between pixel values of adjacent images and/or between portions of those images, and the provided examples are not to be taken as limiting.

In other embodiments, image correlation can be performed between adjacent images (or portions of those images) without generating a subsampled image of the full resolution image. In this situation, for each full resolution image obtained, predetermined pixel locations are addressed, and the addressed pixel locations for adjacent images are correlated. For example, every eighth pixel, sixteenth pixel, or some other pixel location can be addressed for adjacent images, and the values for these pixel locations can be used in a correlation algorithm to determine a correlation value. Based at least in part on the correlation value, an amount of overlap between the images can be determined. The effect is of performing a reduced resolution image correlation without having to generate a reduced resolution image.

Other approaches for determining an amount of image overlap can include using position information obtained from a gyroscope, accelerometer, or other positioning sensor of the device. In accordance with this approach, sensor information obtained from the accelerometer and/or gyroscope can be used to determine a pointing angel of the device, and based on the current pointing angel of the device and the frame rate the images are being obtained, the device can determine a panning speed to ensure the appropriate amount of overlap between adjacent images. It should be noted that both determining the appropriate amount of overlap using image correlation or using device sensor information can be performed concurrently or individually in accordance with various embodiments.

As described, a set of dynamic visual cues can be used to guide a user controlling the device, such as by prompting the user to pan the device in a particular manner (e.g., faster, slower, or to reposition the device to recapture images representing a part of the scene that may have been missed) to ensure an appropriate amount of overlap between adjacent images required for stitching the images together to generate a panorama image. In various embodiments, the visual cues can be adjusted according to whether more or less overlap is needed. For example, as illustrated in example 200 of FIG. 2(a), the visual cues can include an arrow 206 overlaid on a display element of the computing device originating from the center of the current image being captured and pointing in the direction of the scan. The length, color, and/or shape of the arrow can be configured to visually indicate to the user a speed of panning required for obtaining optimal overlap between adjacent images. As described, overlap can be a function of frame-rate and pan-rate. Examples of an optimal amount of overlap can be between 20% and 50% of the preceding image depending on memory constraints, noise in the image, dynamic range, etc. For example, flat well-lit scenes may require overlap of approximately 20% while low-light or high-dynamic range scenes may benefit from more overlap constrained mostly by memory space and the time required to complete the full acquisition. Additionally, in low light with long shutter speeds, panning may be decreased to minimize rolling-shutter artifacts. In this situation, the frame rate can be decreased to prevent too much overlap between adjacent images, because overlap near 100% is redundant and uses too much memory.

Figure 2A:
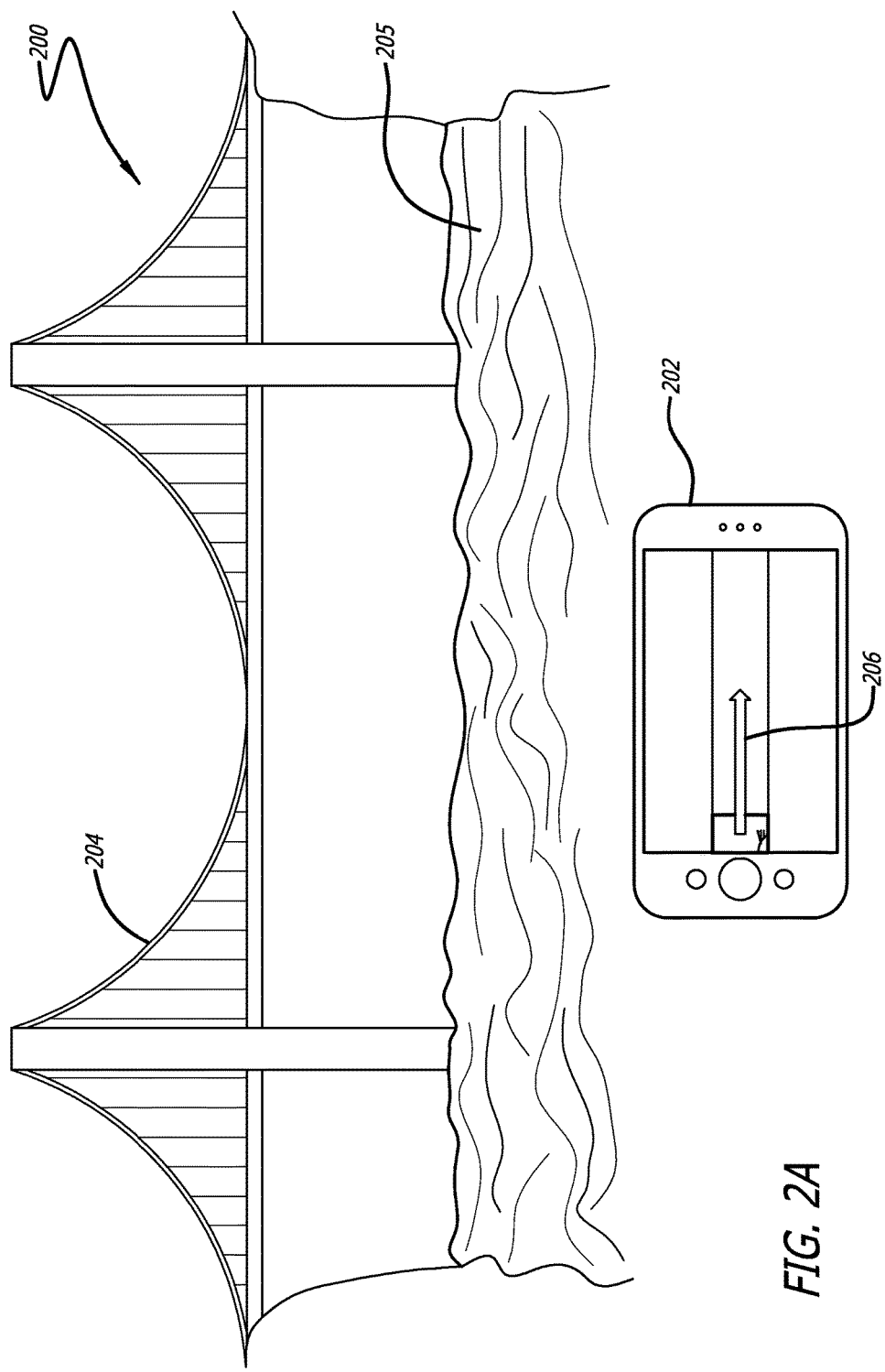
FIGS. 2(a), 2(b), 2(c), 2(d), and 2(e) illustrate an example of managing the capture and/or presentation of images in accordance with an embodiment.
Figure 2B:
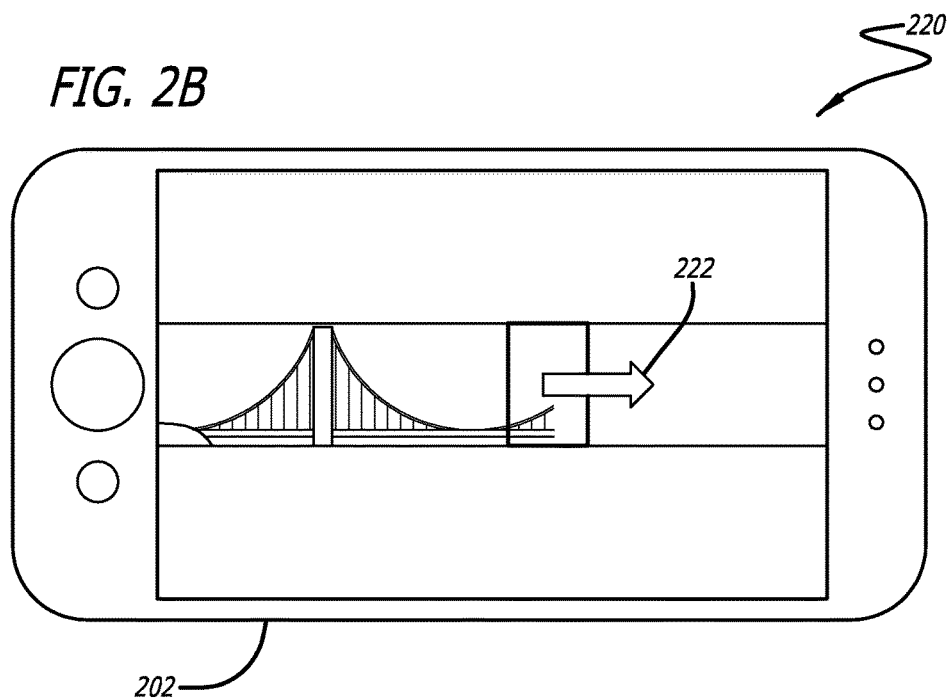
Figure 2C:
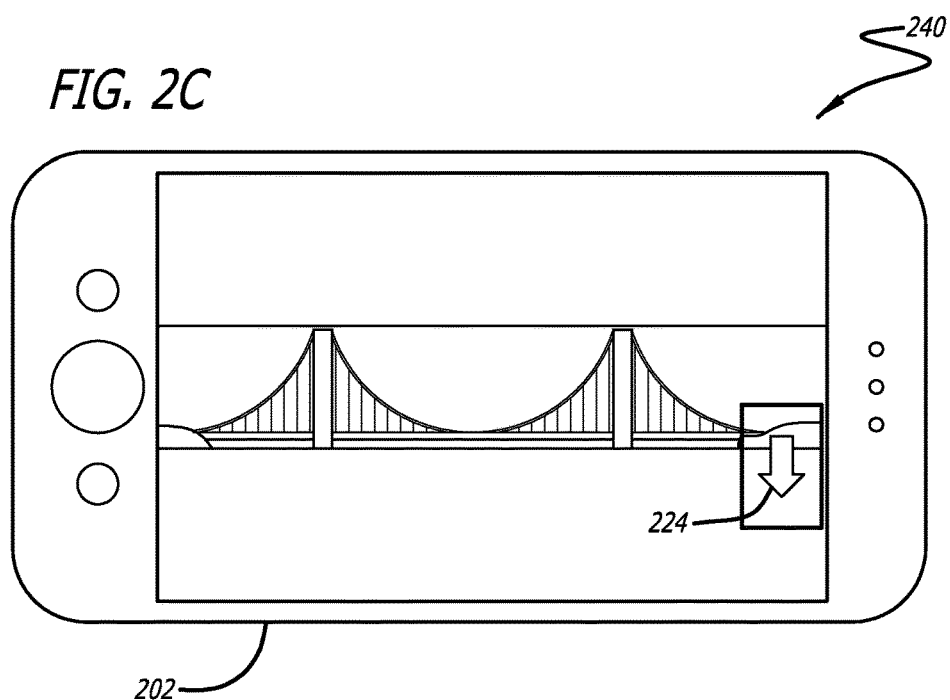

As illustrated in example 200 of FIG. 2(a), the appearance of the arrow is long, indicating that the user may be panning too quickly. As shown in example 220 of FIG. 2(b), the arrow 222 is short, indicating that the user may be panning too slowly. Accordingly, in various embodiments, if the panning is slow, the arrow presented can be short and change to yellow or red if the panning rate is below a predetermined panning rate for based on the memory constraints, noise in the image, dynamic range, etc. If the panning is fast, the arrow presented can be longer, and change to yellow or red if the panning rate is above a predetermined panning rate. In various embodiments, only the portion that is too slow or too fast is rendered in the warning colors and at the correct pan rate, a green arrow can be displayed. If the user changes direction, as illustrated in example 240 of FIG. 2(c), the arrow presented can change direction to reflect the direction of panning. For example, as illustrated in FIG. 2(c), the device has changed from panning in a horizontal direction to a vertical direction, as indicated by arrow 224. In such a situation, the device continues to capture images as the device is panned, and as with panning in a horizontal direction, visual cues can also be provided to ensure an adequate amount of overlap.

Figure 2D:
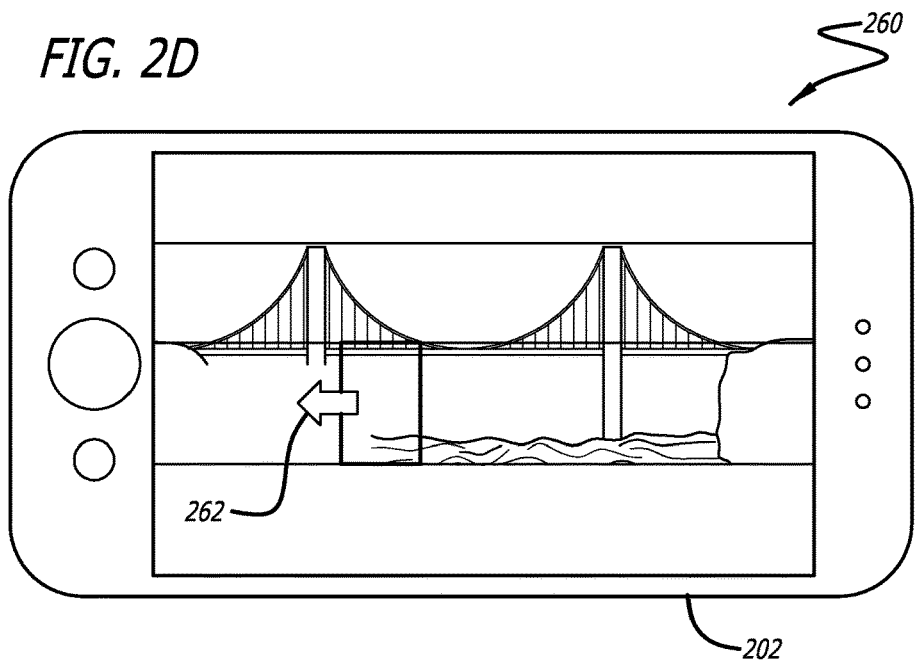
Figure 2E:
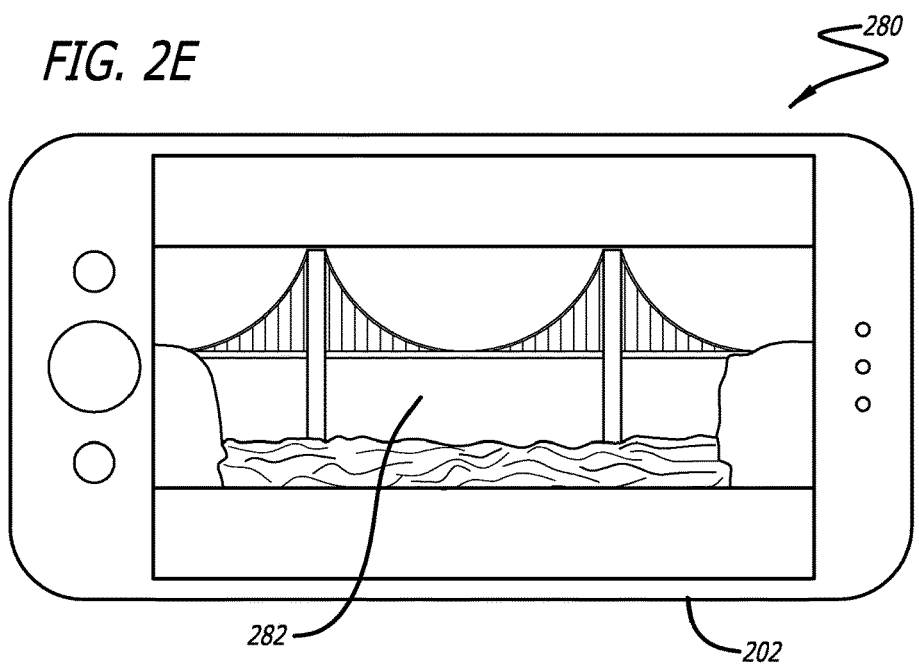

As shown in example 260 of FIG. 2(d), the device is being panned at a pan rate that provides for an appropriate amount of overlap between adjacent images. As such, the user is presented an arrow 262 that is normal in length. Additionally, at the correct pan rate, the displayed arrow can be green or any color or size that indicates that the device is being panned at the correct rate. It should be noted that although an arrow is shown, any visual indicator can be presented to the user to guide the user in panning the device, as well as audible or haptic cues. Further, in various embodiments, the visual cues can be ghosted to minimize interference with the image or the arrows could be hollow. The sense of the arrows could be reversed (i.e., when the panning is to slow, the arrow can be made longer to suggest a higher panning speed to the user). Other cues such as voice can be used, in addition or instead of the visual cues. Upon completing the image capture process, the user can be presented a panorama image 282 of the scene captured, as shown in example 280 of FIG. 2(e). It should be noted that unlike the completed panorama image shown in FIG. 1(b), the completed panorama image 282 shown in FIG. 2(e) includes both the bridge and water. This is due in part to the ability to obtain images by panning in multiple directions.

In accordance with various embodiments, approaches described herein are useful whether the panoramas are generated locally on the device or uploaded to a remote server for processing. In some embodiments, a low resolution panorama can be calculated on the device for a preview while the full set of images can be uploaded to the remote server where a full resolution or high resolution panorama can be created using the computational capabilities of the remote server. For example, the camera can be panned horizontally or vertically, or both, to capture a set of images. Each image of the set of images can be tagged as being part of a panorama image. The set of images can further be keyed to the device computed subsampled panorama image. In this way, when a high resolution panorama image is provided to the computing device, the device can replace and/or associate the high resolution panorama image with the subsampled panorama image.

As described, the set of images can be transmitted from the computing device over the network (e.g., Internet, intranet, LAN, WLAN, cellular wireless telephony, data network, etc.) to the remote server. The remote server can provide network infrastructure and resources for running various applications and/or other computing operations. In accordance with various embodiments, a number of conditions can influence when the images are transmitted, such as network connection type, battery level of the device, among others. In some situations, for example, the images can be transmitted to the remote server when the portable computing device is charging. In other situations, the images can be transmitted to the remote server when the device is connected to a wireless network.

Upon receiving the set of images, the remote server can process the images to generate a panorama image. For example, the one or more algorithms can be utilized to stitch the set of images together to create a panorama image. In accordance with various embodiments, stitching the images together can include performing at least image registration, image calibration, and image blending. Image registration can involve matching features in a set of images or using direct alignment methods to search for image alignments that minimize the sum of absolute differences between overlapping pixels. The images can be aligned using any number of image alignment algorithms or other algorithms to determine an alignment offset or other correspondence relationship among images with varying degrees of overlap. For example, these algorithms can be used to: determine an appropriate mathematical model that relates pixel coordinates in one image to pixel coordinates in another image; to estimate the correct alignments relating various pairs (or sets) of images such as an alignment offset; to use direct pixel-to-pixel comparisons combined with gradient descent (and other optimization techniques) to estimate the correct alignments. Additionally or alternatively, alignment algorithms can use distinctive features found in each image to efficiently match the distinctive features found in other images to rapidly establish correspondences and other alignment offsets between pairs of images, and the alignment offset can be used to align the two images.

Image calibration can involve minimizing differences between ideal lens models and the camera-lens combination used, optical defects such as distortions, exposure differences between images, vignetting, camera response and chromatic aberrations. In the situation where feature detection methods were used to register images and absolute positions of the features were recorded and saved, stitching algorithms may use the data for geometric optimization of the images in addition to placing the images on the panosphere. Image blending can involve executing the adjustments figured out in the calibration stage, combined with remapping of the images to an output projection. Colors can be adjusted between images to compensate for exposure differences. If applicable, high dynamic range merging is done along with motion compensation and deghosting. Images can be blended together and seam line adjustment can be performed to minimize the visibility of seams between images. Having performed these operations, the remote server can further process the panorama image, such as by performing a number of other processing algorithms that can be used to correct for lens distortion, perspective, brightness, brightness and gamma blend, and rotation.

Other image processing techniques can be performed as well. As described, when the images are captured, the exposure of the device can be automatically adjusted to account for different lighting conditions of the scene being captured. For example, as the device obtains images, the shutter speed and/or gain of the device can be adjusted, where images corresponding to bright areas of the scene can be captured at a low shutter speed and images captured of the dark areas of the scene can be captured at a longer shutter speed (or high gain). Stitching the images together results in an image that includes different exposures for the various areas of the image and the image can be processed using tone mapping or other similar algorithms to reduce overall contrast to facilitate display of the panorama HDR image on devices with lower dynamic range.

Other approaches include improving the signal-to-noise ratio of portions of the panorama image through image stacking. As described, images obtained in low light settings may be noisy. In accordance with various embodiments, image stacking can be performed to improve the signal-to-noise ratio for those images. For example, in low light settings, the user is presented a visual cue to pan more slowly to obtain additional images. Additionally, the frame rate can be adjusted to capture additional images. The remote server can align the images for the low light sections and the pixel values for corresponding locations in the adjacent images can be combined (e.g., averaged, interpolated, etc.). Combining pixel values for corresponding locations can include receiving as input two substantially similar sized images, and generating as output a third image of the same size as the first two, in which each pixel value of the third image is the sum of the values of the corresponding pixel from each of the two input images. In the case where the pixel values in the input images are vectors rather than scalar values (e.g., for color images), then the individual components (e.g., red, blue and green components) can be added separately to generate the output value. It should be noted that other methods and/or algorithms can be used to combine pixel values, and the embodiments disclosed herein are not meant to be taken as limiting. For example, a summing algorithm can be used, where the output image is the sum of the input images. An averaging algorithm can be used, where the output image is the average of the input images. A median algorithm can be used, where the output image is the median of the input images at each pixel. A minimum or maximum reject algorithm can be used, where the output image is the average of the input images, excluding the minimum, maximum, or both, respectively, at each pixel.

Thereafter, the panorama image can be provided to the computing device. The user can be presented a prompt on whether to accept, save, or discard the panorama image. The accepted (and in some instances the discarded) image can be stored on the computing device and/or the remote server, such as in a database located on or separate from the remote server. In accordance with an embodiment, the images stored on the remote server can be made accessible to the computing device. For example, the user may have created an account with a service that provides a cloud-based photo album, and the user can decide to store certain images in the cloud-based photo album. Alternatively, when the user accesses the remote server, such as to access a cloud-based photo album, the device created subsampled panorama can serve as a key to the full resolution panorama sequence, which can then be downloaded to the computing device. In some embodiments, a subsampled version of the panorama sequence may be communicated to the user's device (while a full resolution version of the panorama sequence is stored at the remote server). This is useful in the situation where the user's device does not have the ability to display a high resolution image.

Figure 3A:
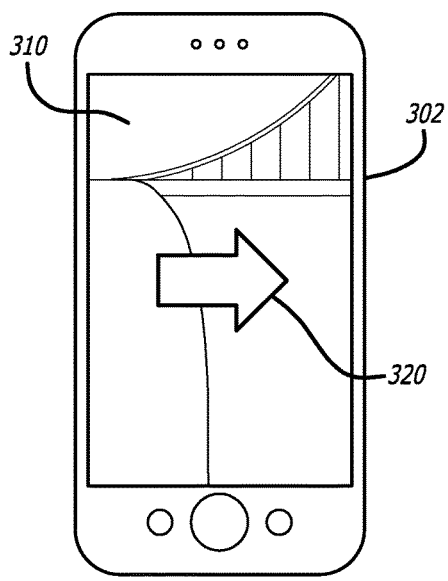
FIGS. 3(a), 3(b), 3(c), and 3(d), illustrate an example of managing the capture and/or presentation of images in accordance with an embodiment.
Figure 3B:
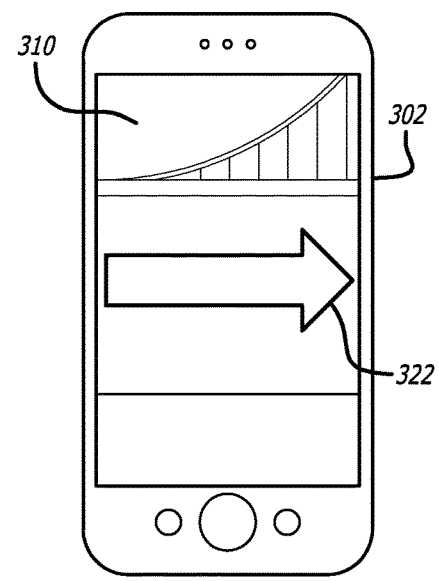
Figure 3C:
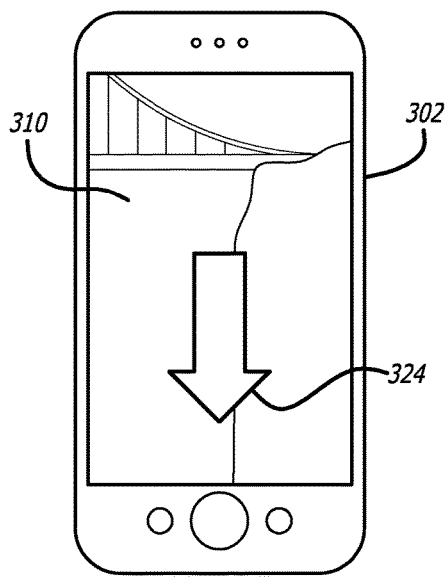
Figure 3D:
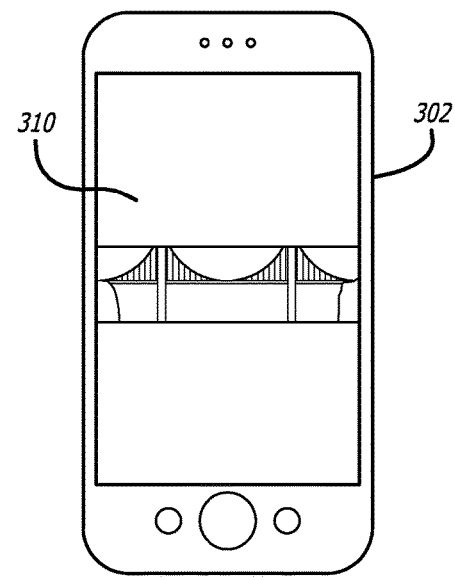
Figure 5C:
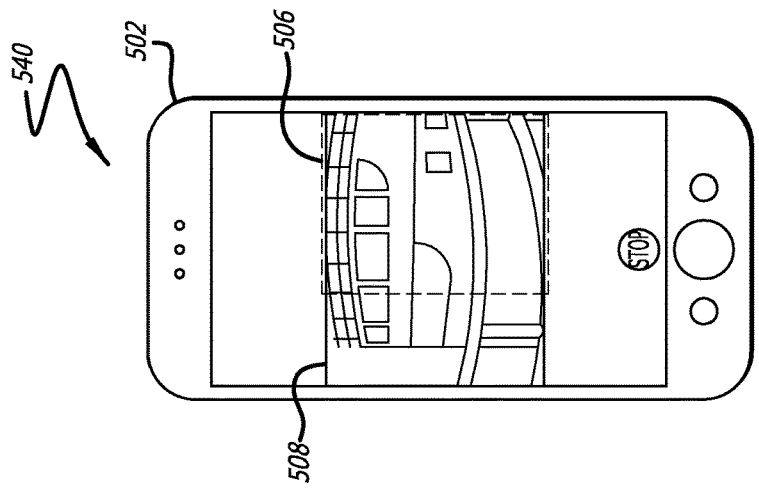
FIGS. 5(a), 5(b), 5(c), 5(d), 5(e), and 5(f) illustrate an example of managing the capture and/or presentation of images in accordance with an alternate embodiment.
Figure 5B:
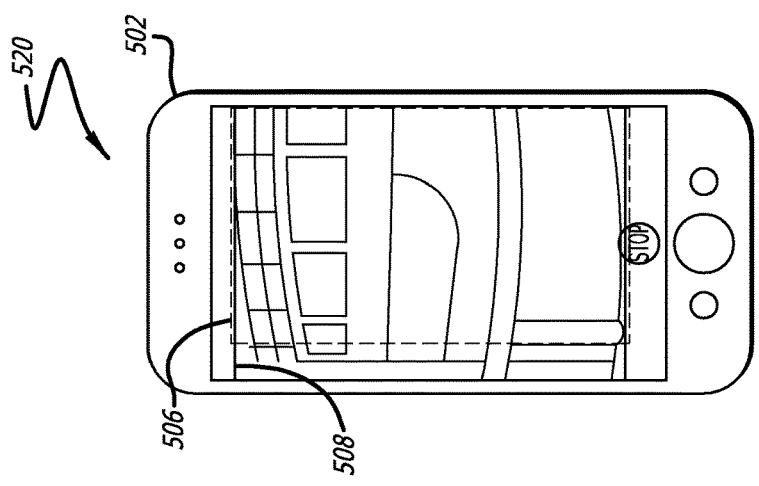
Figure 5A:
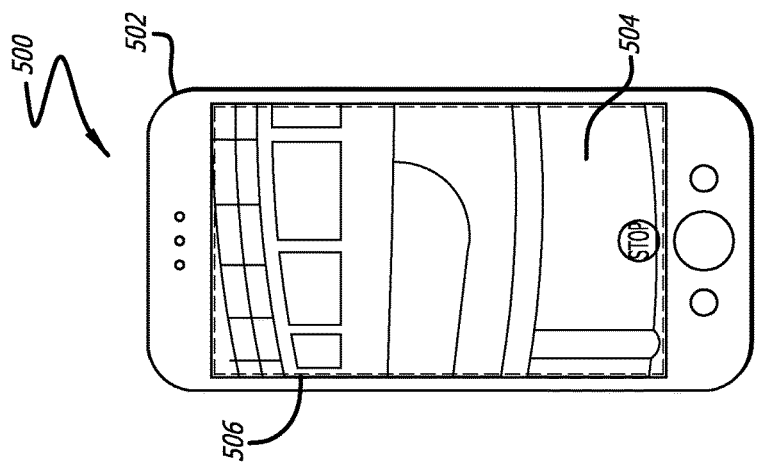
Figure 5F:
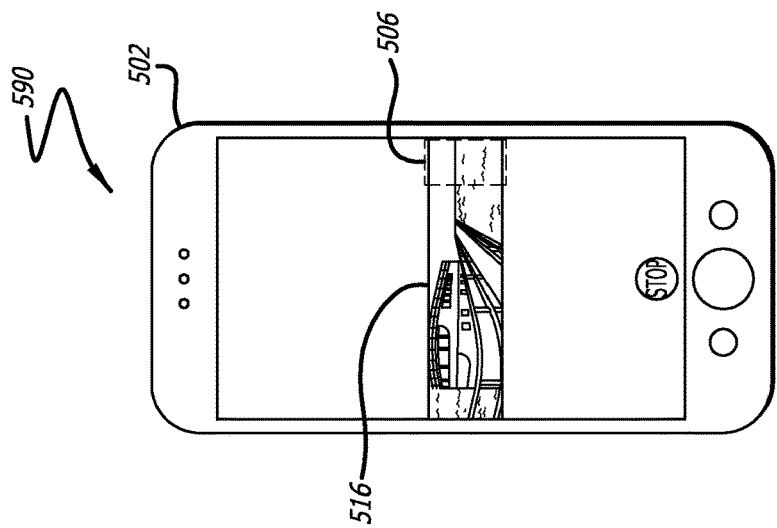
Figure 5E:
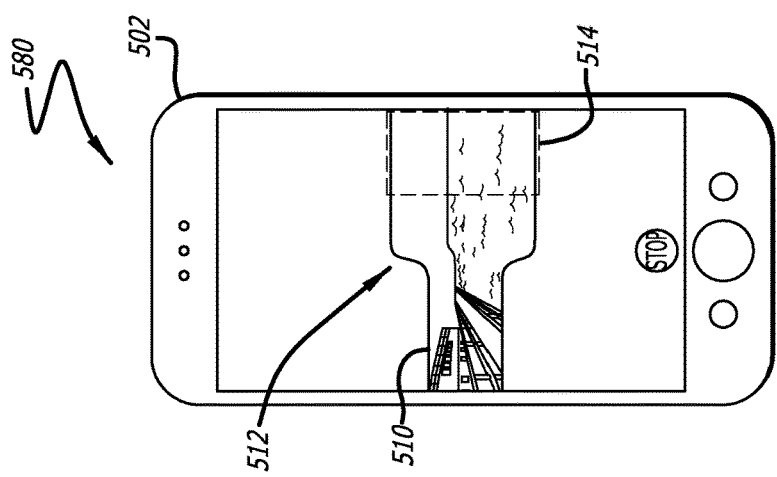
Figure 5D:
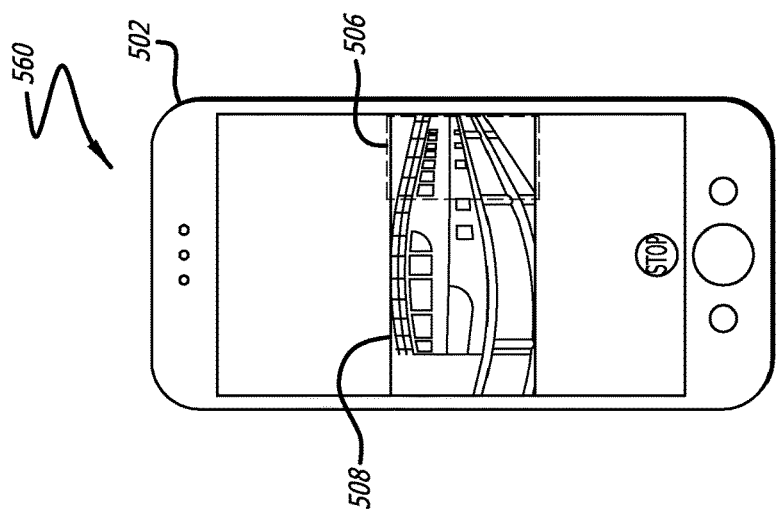

Other approaches are also possible in accordance with various embodiments, as one skilled in the art would determine. For example, FIGS. 3(a), 3(b), 3(c), and 3(d), illustrate a panorama mode where the image currently in the camera's field of view is displayed such that the image fills an entire view of a display element of the device, and overlaid on the image are visual cues for panning as the user continues to capture images used to create a panorama image. For example, as shown in FIG. 3(a), device 302 is displaying on display element 310 the image currently in the camera's field of view. As shown, the current image is scaled to fill the entire display element and overlaid on the current image is at least one cue to guide the user in panning. For example, cue 320 can indicate to the user that they are panning too slowly, cue 322 shown in FIG. 3(b) can indicate to the user that they are panning too quickly, and cue 324 shown in FIG. 3(c) can indicate to the user that they are panning in a vertical direction. As the user pans the device horizontally or vertically, the user is presented the actual image captured throughout the image capture process, along with an appropriate cue. Upon completing the image capture process, the user is presented with a complete panorama image, such as the panorama image shown in FIG. 3(d).

In accordance with various embodiments, in such an approach, one or more algorithms use the largest extent of each pan (horizontal and vertical) to determine an intended extent of the final panorama and cues can be used to guide the user to ensure full coverage so that the post-projection corrected panorama substantially fills a rectangular area as determined by observing the extent of each pan as indicated by a direction reversal (typically accompanied by an indexing in the orthogonal direction). Further, the cues can direct the user to rescan an area not adequately scanned in a previous pass to ensure full coverage in the final panorama. Such an approach may be preferred for devices having a small screen, where attempts to present a full panorama in-progress may result in a difficult to see representation (e.g., due to the size of the presented image). Such an approach may also be preferred by users who are using fine details of the image to determine the extent of the panorama, which may be difficult to discern in a representation of reduced resolution designed to fit a particular display screen or window.

FIG. 4 illustrates an example process 400 for managing the capture and/or presentation of image information in accordance with various embodiments. It should be understood that, for any process described herein, that there can be additional or fewer steps performed in similar or alternative orders, or in parallel, within the scope of the various embodiments unless otherwise stated. A user of a computing device (e.g., a mobile phone, a tablet computer, etc.) can use a camera of the device to capture an image of a scene or subject matter(s) of interest. As described, the user can activate a panorama mode of the device and can sweep the device horizontally or vertically, or both, such that the user is able to capture an image of an entire scene. In such an approach, images are captured 402 continuously as the device is panned relative to the scene. An overlap between adjacent images is determined 404 image-by-image to ensure an appropriate amount of overlap and alignment required for stitching the images together. As described, image correlation algorithms and/or sensor information obtained from device components (e.g., the gyroscope, accelerometer, or other positioning determining components) can be used to determine an amount of overlap between adjacent images. A panning direction of the device relative to the scene is also determined 406. Based at least in part on the amount of overlap and the panning direction of the device, visual, audio, and/or haptic cues can be presented 408 to the user on the display of the device to help guide the user in panning the device to ensure the appropriate amount of overlap. In accordance with various embodiments, the visual cues can be used to guide a user controlling the device, such as by prompting the user to pan the device in a particular manner (e.g., faster, slower, or to reposition the device to recapture images representing a part of the scene that may have been missed) to ensure the appropriate amount of overlap and alignment between captured images required for stitching images together. When a stop request or some other indication of completion is received, the user can be presented 410 a panorama image of the captured scene on the display of the device. Alternatively, the set of images can be transmitted from the device over the network (e.g., Internet, intranet, LAN, WLAN, etc.) to a remote server. As described, the remote server can provide network infrastructure and resources for running various applications and/or other computing operations. Upon receiving the set of images, the remote server can process the images to generate a panorama image. For example, the one or more algorithms can be utilized to stitch the set of images together to create a panorama image. Additionally, the remote server can perform one or more algorithms useful for image enhancement, such as to improve a quality, resolution, sharpness, color depth of the images, and/or correct for lens distortion, perspective, brightness, rotation, etc. Other image processing techniques can be performed as well. For example, as described, colors can be adjusted between images to compensate for exposure differences. If applicable, high dynamic range merging is done along with motion compensation and deghosting, and images can be stacked to reduce the signal-to-noise ratio for portions of the image obtained under low light. The panorama image can be provided to the device for display on a display element (e.g., a screen) of the computing device. In accordance with an embodiment, a prompt (such as a pop-up or overlay) can be provided to a user upon receiving the processed image, where the user can select between a plurality of options associated with the processed image and the reference image. In accordance with an embodiment, the options can be, e.g., to save or discard the image.

In various embodiments, the device can be caused to enter a panorama mode when a panning motion or other motion is detected by the device. For example, the user can activate an image capture application and begin to pan the device. The device can detect the panning motion via image registration techniques described previously or from sensor data captured from one or more location and/or motion detecting components, such as a gyroscope and/or accelerometer. Upon detecting the panning motion, the device can enter a panorama mode, where using a zero shutter lag techniques the device can begin capturing images to generate a panorama image. In the situation a panorama mode is entered into but is not desired, the user can exit the panorama mode by any one of a number of approaches, such as by performing a motion of the device (e.g., by flicking the user's wrist or otherwise causing the device to move in a particular manner), speaking a voice command, or selecting a real or virtual button.

Other approaches can be used as well in managing the capture and/or presentation of images. For example, a user operating a device in a panorama mode can be presented the entire image being captured at the highest scale possible by filling the entire display element with the image and dynamically scaling down the image as the user continues to add to the panorama. Depending on the orientation of the device, screen dimensions, and direction of the panorama being captured, one of the height or width is scaled down as the panorama image is obtained. For example, as shown in example 500 of FIG. 5(*a*), a portable computing device 502 is being used to capture a panorama image of a boat. The portable computing device can include, for example, a camera and an interface 504 (e.g., a display element) that displays the field of view of the camera. The device can be aimed in different directions and the interface can display an image or video of the current/active field of view being captured by the camera.

Conventionally, when such a device is operating in a panorama mode, only a portion of the current panorama image being captured is displayed. In accordance with various embodiments, a user operating a device in a panorama mode or other image capture mode can be presented the entire image being captured at the highest scale possible by filling the width of the display element with the panorama image and dynamically scaling down the height of the image as the user continues to add to the length of the photo. For example, as shown in example 500 of FIG. 5(*a*), the image presented on the display element 504 fills the entire display. A display section 506 can indicate which portion of the panorama image being captured is currently in the camera's field of view by representing that portion of the panorama image as being inside a box or some other visual indicator. As the user pans the device horizontally or vertically, the user is presented the actual image captured throughout the image capture process. For example, as shown in example 520 of FIG. 5(*b*), example 540 of FIG. 5(*c*), and example 560 of FIG. 5(*d*), as the device is panned left to right the user is presented the entire image 508 being captured at the highest scale possible by filling the width of the display element with the panorama image and the height of the image is dynamically scaled down as the user continues to add to the length of the panorama image.

In accordance with various embodiments, in the situation where the image's width exceeds the image's height by more than a threshold amount, as can often happen while taking a panorama image, the image can be distorted to avoid having to present an image that is too small (e.g., smaller than a predetermined size) to determine what is currently being captured. In such a situation, at least a portion of the panorama image currently in the camera's field of view does not shrink beyond a predefined size and the rest of the panorama is distorted or 'squeezed' into the remaining space on the display, resulting in a sideways funnel-type view of the image. For example, as shown in example 580 of FIG. 5(*e*), the panorama image currently in the camera's field of view is magnified on the display to display a magnified portion of the image 514, while the images previous captured and part of the panorama image 510 do not shrink beyond a predefined size (as based on the orientation of the device and the size of the display element), resulting in a sideways funnel-type view 512 of the already captured images and the image currently in the camera's field of view. When the user finishes capturing the panorama image, the image presented can normalize back into a rectangle 516, as illustrated in example 590 of FIG. 5(*f*). It should be noted that in various embodiments, depending on the orientation of the device, screen dimensions, and direction of the panorama being captured, the image being captured is presented at the highest scale possible by filling the height of the display element with the panorama image and dynamically scaling down the width as the panorama image is obtained. In various embodiments, dynamically scaling the image can include scaling the image at substantial the same time as the camera is panned.

FIG. 6 illustrates an example process 600 for managing the capture and/or presentation of image information in accordance with an alternate embodiment. A user of a computing device (e.g., a mobile phone, a tablet computer, etc.) can use a camera of the device to capture an image of a scene or subject matter(s) of interest. As described, the user can activate a panorama mode of the device and can sweep the device horizontally or vertically, or both, such that the user is able to capture the entire scene. A user operating 602 a device in a panorama mode can be presented 604 an entire image being captured at the highest scale possible by filling the filling the entire display element with the image. As the device receives an indication of being panned 606, the image presented is cause to be dynamically scaled 608 down as the panning continues to add to the length of the panorama image. For example, depending on the orientation of the device, screen dimensions, and direction of the panorama being captured, one of the height or width is scaled down as the panorama image is obtained. A display section can be provided that indicates which portion of the panorama image being captured is currently in the camera's field of view by representing that portion of the panorama as being inside a box or some other visual indicator. As the user pans the device horizontally or vertically, or both, the user is presented the actual image captured throughout the image capture process. When the user indicates that they have finished capturing the panorama image, such as by selecting a stop bottom on the display or providing some other stop request, the panorama image is presented 610 to the user on the display of the device.

Figure 7:
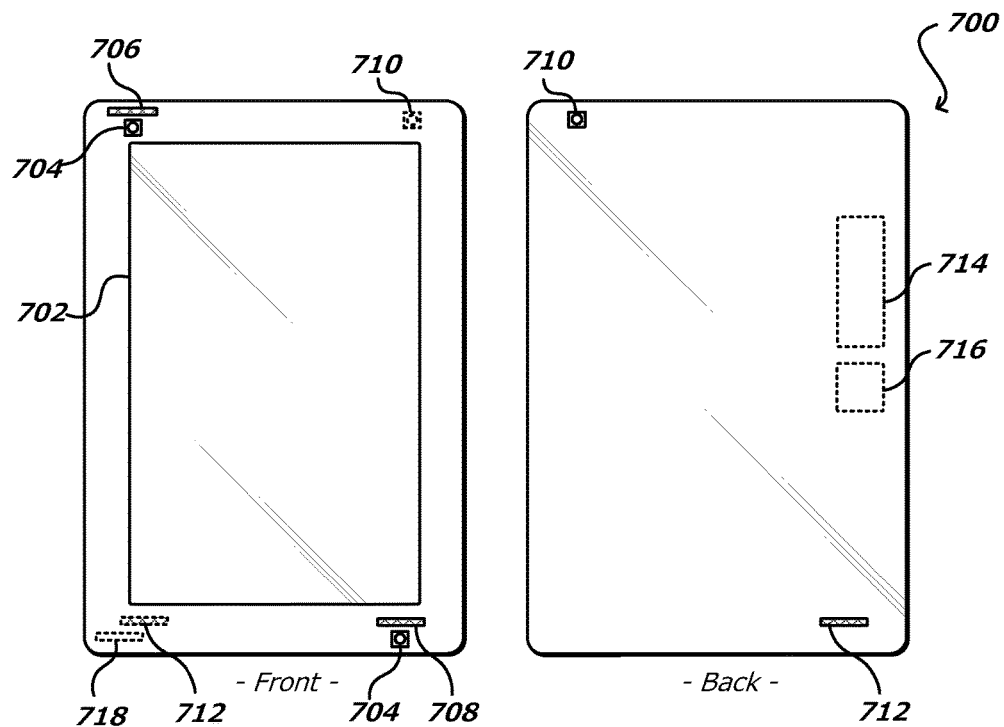
FIG. 7 illustrates front and back views of an example portable computing device that can be used in accordance with various embodiments.

FIG. 7 illustrates front and back views of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, portable media players, wearable computers (e.g., watches, glasses, etc.), among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a metal oxide semiconductor device (CMOS), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
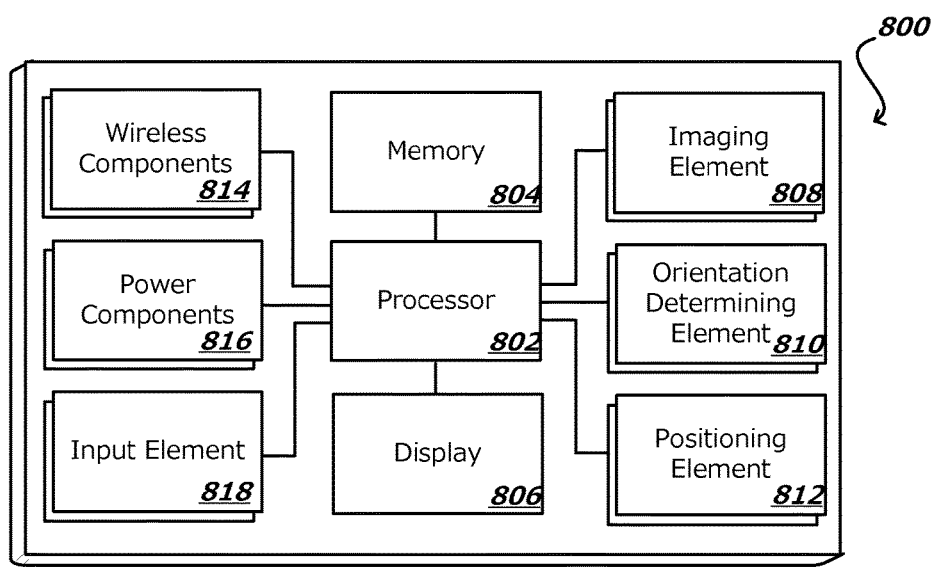
FIG. 8 illustrates an example set of basic components of a portable computing device, such as the device described with respect to FIG. 7.

FIG. 8 illustrates a set of basic components of an electronic computing device 800 such as the device 800 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CMOS image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g., distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 9:
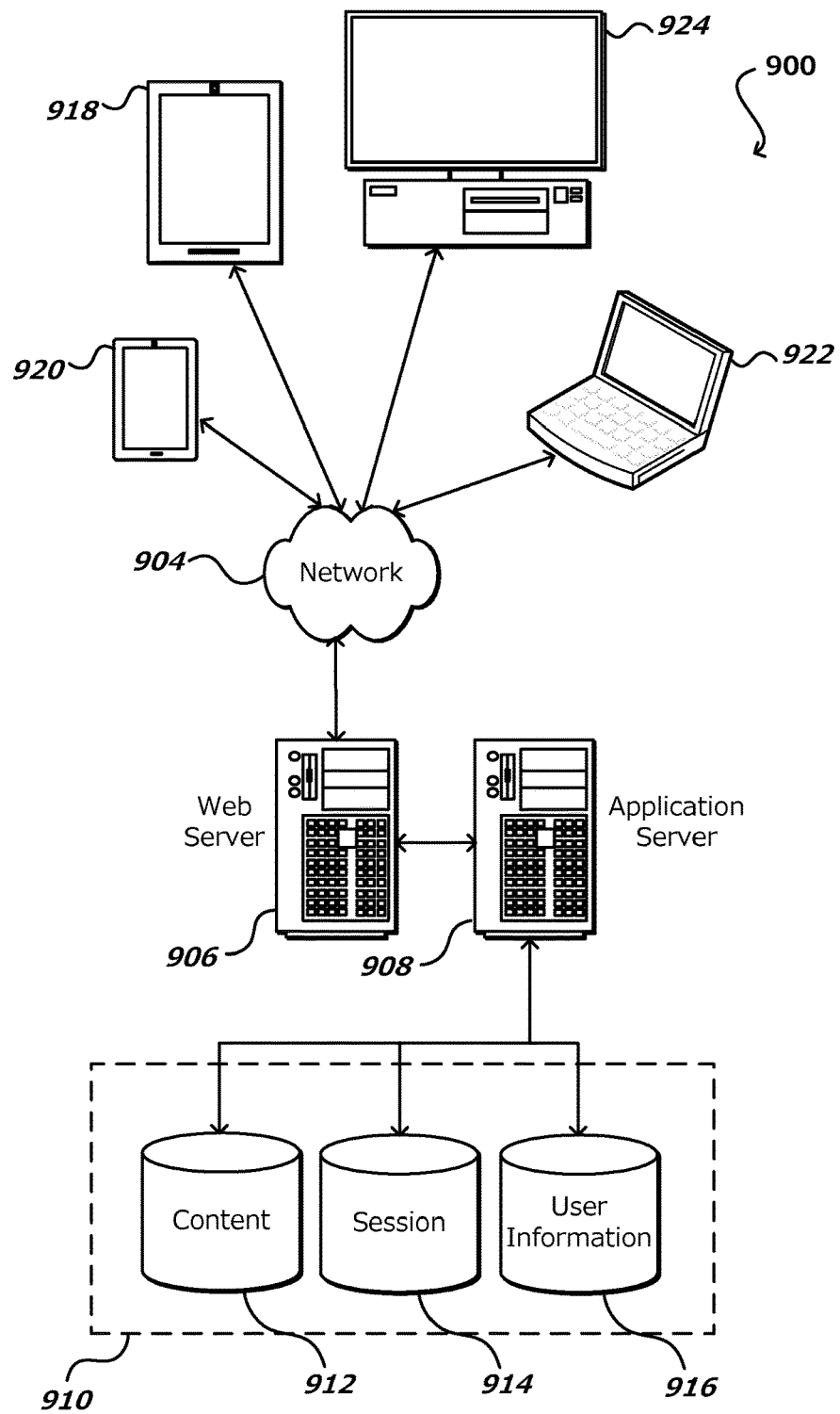
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes electronic client devices 918, 920, 922, and 924, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client devices 918, 920, 922, and 924 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 918, 920, 922 and 924. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
    a camera;
    a display element;
    at least one processor; and
    memory including instructions that, when executed by the at least one processor, cause the computing device to:
        acquire, by the camera, a first image representing a first portion of a first scene;
        acquire, by the camera, a second image representing a second portion of the first scene, the first image and the second image being captured during a first period of time the camera is panned, wherein the first image and the second image are at least partially overlapping;
        determine a first dynamic range of the first scene;
        determine a first amount of overlap for registering a first pair of images corresponding to the first dynamic range;
        acquire, by the camera, a third image of a first portion of a second scene;
        acquire, by the camera, a fourth image of a second portion of the second scene, the third image and the fourth image being captured during a second period of time the camera is panned, wherein the third image and the fourth image are at least partially overlapping;
        determine a second dynamic range of the second scene, the second dynamic range representing a greater dynamic range than the first dynamic range;
        determine a second amount of overlap for registering a second pair of images corresponding to the second dynamic range, the second amount of overlap representing a greater amount of overlap than the first amount of overlap;
        determine that a third amount of overlap between the third image and the fourth image is below the second amount of overlap; and
        present, on the display element of the computing device, a visual indicator including information for reducing a panning speed of the camera.

2. The computing device of claim 1, wherein the instructions, when executed, further cause the computing device to:
    provide the third image and the fourth image to a remote server;
    register the first image and the second image to generate at least a portion of a panorama image; and
    provide the panorama image to the computing device.

3. The computing device of claim 1, wherein the instructions, when executed, further cause the computing device to:
    present, on the display element, a first panorama image including at least a portion of the third image and at least a portion of the fourth image;
    generate a second panorama image by scaling the first panorama image to fit on the display element; and
    present the second panorama image on the display element.

4. The computing device of claim 1, wherein the visual indicator includes at least an arrow instructing that the camera be panned slower than the current panning speed.

5. A computer implemented method, comprising:
    acquiring a first sequence of images captured using a camera of a computing device during a first period of time the camera is panned, the first sequence of images comprising at least a first image and a second image, wherein the first image and the second image comprise at least partially overlapping portions of a first scene;
    determining a first dynamic range of the first scene;
    determining a first amount of overlap for registering a first pair of images corresponding to the first dynamic range;
    acquiring a second sequence of images captured using the camera during a second period of time the camera is panned, the second sequence of images including at least a third image and a fourth image, wherein the third image and the fourth image are at least partially overlapping portions of a second scene;
    determining a second dynamic range of the second scene, the second dynamic range representing a greater dynamic range than the first dynamic range;
    determining a second amount of overlap for registering a second pair of images corresponding to the second dynamic range, the second amount of overlap representing a greater amount of overlap than the first amount of overlap;
    determining that a third amount of overlap between the third image and the fourth image is below the second amount of overlap; and
    providing, during the second period of time the camera is panned, a cue including information for reducing a panning speed of the camera.

6. The computer implemented method of claim 5, wherein the cue is further based on at least one determined operating condition, the at least one determined operating condition including at least one of a frame rate of the camera, a detected amount of light of at least a portion of the second scene, a panning speed of the camera, or an exposure setting of the camera.

7. The computer implemented method of claim 5, further comprising:
    determining a first low resolution image for the third image;
    determining a second low resolution image for the fourth image; and
    determining the second amount of overlap using the first low resolution image and the second low resolution image.

8. The computer implemented method of claim 5, wherein the second amount of overlap is determined using at least one of an image correlation algorithm or sensor information, the sensor information being obtained from at least one of a gyroscope or an accelerometer of the computing device.

9. The computer implemented method of claim 5, further comprising:
    computing a cross-correlation of at least a portion of the third image with at least a portion of the fourth image; and
    determining the second amount of overlap based at least in part on the cross-correlation.

10. The computer implemented method of claim 5, wherein the cue includes at least one of a visual cue, an audible cue, or a haptic cue.

11. The computer implemented method of claim 10, wherein the cue includes at least an arrow instructing that the camera be panned slower than the current panning speed.

12. The computer implemented method of claim 5, further comprising:
    providing the first image and the second image to a remote server;
    registering the first image and the second image to generate at least a portion of a panorama image; and
    providing the panorama image to the computing device.

13. The computer implemented method of claim 12, further comprising:

performing at least one of lens distortion correction, perspective correction, brightness correction, rotation correction, brightness and gamma blend, tone mapping, or high-dynamic range imaging on the panorama image.

14. The computer implemented method of claim 5, further comprising:
presenting, on a display element of the computing device, a first panorama image including at least a portion of the third image and at least a portion of the fourth image;
generating a second panorama image by scaling the first panorama image to fit on the display element; and
presenting the second panorama image on the display element.

15. The computer implemented method of claim 5, further comprising:
causing the camera to operate in a full resolution video mode for capturing images in succession.

16. The computer implemented method of claim 5, further comprising:
providing the second sequence of images to a remote server; and
averaging pixel values for corresponding pixel locations for the second amount of overlap between the third image and the fourth image based at least in part on one of average pixel values for the corresponding pixel locations, weighted average of pixel values for the corresponding pixel locations, or interpolated pixel values for the corresponding pixel locations.

17. A non-transitory computer readable storage medium storing instructions that, when executed by one or more processors, cause a computing device to:
acquire a first sequence of images captured using a camera of the computing device during a first period of time that the camera is panned, the first sequence of images including at least a first image and a second image, wherein the first image and the second image comprise at least partially overlapping portions of a first scene;
determine a first dynamic range of the first scene;
determine a first amount of overlap for registering a first pair of images corresponding to the first dynamic range;
acquire a second sequence of images captured using the camera during a second period of time the camera is panned, the second sequence of images including at least a third image and a fourth image, wherein the third image and the fourth image are at least partially overlapping portions of a second scene;
determine a second dynamic range of the second scene, the second dynamic range representing a greater dynamic range than the first dynamic range;
determine a second amount of overlap for registering a second pair of images corresponding to the second dynamic range, the second amount of overlap representing a greater amount of overlap than the first amount of overlap;
determine that a third amount of overlap between the third image and the fourth image is below the second amount of overlap; and
provide, during the second period of time the camera is panned, a cue including information for reducing a panning speed of the camera.

18. The non-transitory computer readable storage medium of claim 17, wherein the cue is further based on at least one determined operating condition, the at least one determined operating condition including at least one of a frame rate of the camera, a detected amount of light of at least a portion of the second scene, the panning speed of the camera, or an exposure setting of the camera.

19. The non-transitory computer readable storage medium of claim 17, wherein the instructions when executed by the one or more processors further cause the computing device to:
determine a first low resolution image for the third image;
determine a second low resolution image for the fourth image; and
determine the second amount of overlap using the first low resolution image and the second low resolution image.

20. The non-transitory computer readable storage medium of claim 17, wherein the instructions when executed by the one or more processors further cause the computing device to:
present, on a display element of the computing device, a first panorama image including at least a portion of the third image and at least a portion of the fourth image;
generate a second panorama image by scaling the first panorama image to fit on the display element; and
present the second panorama image on the display element.

* * * * *